Feb. 6, 1951 — M. BITZER — 2,540,319
POWER TRANSMISSION UNIT
Filed March 5, 1947
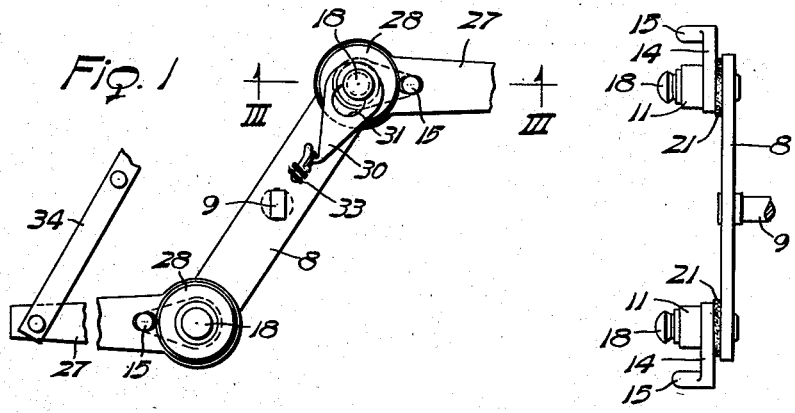
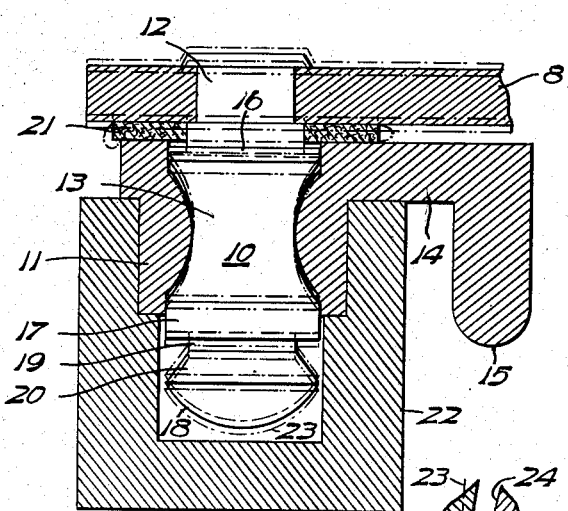
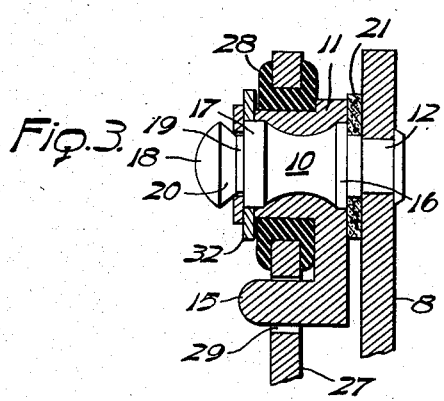
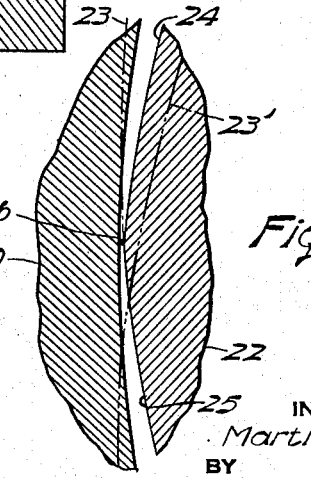
INVENTOR
Martin Bitzer
BY
Beau, Brooks, Buckley + Beau.
ATTORNEYS Patented Feb. 6, 1951

2,540,319

UNITED STATES PATENT OFFICE 2,540,319

POWER TRANSMISSION UNIT

Martin Bitzer, Kenmore, N. Y., assignor to Trico Products Corporation, Buffalo, N. Y.

Application March 5, 1947, Serial No. 732,406

5 Claims. (Cl. 308—2)

The invention relates in general to power transmission units.

In the manufacture of automotive accessories, for example windshield cleaners, by mass production, it is very desirable that the bearing parts be assembled with a minimum effort and that the assembly of the parts be accelerated and accomplished by a simplification of construction.

The principal object of this invention has been to provide transmission means which may be easily and expeditiously manufactured, and further to produce an improved and practical unit which embodies a minimum clearance between the relative moving parts thereof to insure a better performance in use.

Another object has been to provide a unit capable of having its component parts secured together by a molding procedure which affords economy in production.

The above objects and advantages have been accomplished by the device shown in the accompanying drawings, of which:

Fig. 1 shows a face view of a crank arm with link members connected thereto by means of the instant invention, portions thereof being broken away and omitted for clearness of illustration;

Fig. 2 is a side elevation of the crank arm showing only the transmission or connecting means of the invention in such positions as to clearly illustrate them;

Fig. 3 is an enlarged, sectional view of the assembled invention, taken on line III—III of Fig. 1;

Fig. 4 is an enlarged cross sectional view illustrating a step in the method of manufacturing the transmission unit; and Fig. 5 is a greatly enlarged fragmentary longitudinal sectional view taken through the shaft and sleeve.

It is obvious that the herein described transmission unit may be used to connect any two coacting mechanical devices, although for illustrative purposes I have shown the invention as applied to a vehicle windshield cleaner wherein the double throw crank arm 8 is fixed to the oscillatory power shaft 9 of a windshield cleaner motor and carries at its opposite ends the upstanding crank pins in the form of spindles or stub shafts 10.

A transmission unit is attached to each shaft member 10 by a sleeve or collar member 11. The shaft member is provided with a reduced mounting shank 12 which is secured, as by a swaging operation, to the crank arm 8.

The sleeve member 11 of the unit is secured to and formed upon the bearing surface 13 of the shaft member 10 preferably by being die cast thereon and may be formed with a laterally extending bearing arm 14 that terminates in an upstanding retaining pin 15.

The shape of the spindle or shaft member 10 may be of any desired shape which, upon relative axial movement between the parts, will cause a slight spreading action of the bearing surface of the sleeve in order to break the adhesion between the shaft and the sleeve, and further to provide slight clearance between the bearing surfaces of the coacting parts. This will insure a minimum clearance while affording free relative pivotal movement between the parts. For clearness of illustration, I have shown the bearing surface or portion 13 with a generally concave periphery, but it may have a hyperboloid shape or other shape equivalent for the intended purpose and function.

The concave surface 13 of the spindle may terminate at one end in a cylindrical portion 16 and at the opposite end in a similar cylindrical portion 17. The shaft is extended beyond the collar 17 in a head 18 which is separated from the collar by means of a groove 19. The outer side wall of the groove provides an inclined surface 20 for purposes to be hereinafter described.

After the sleeve member 11 has been so molded about the bearing portion of the shaft member the shank 12 is swaged or riveted in place upon the crank arm. A lubricant-bearing washer 21 may be initially placed about the shank if desired. The adhesion between the shaft and the encircling die cast sleeve is preferably broken at the time of swaging the shank 12. This is accomplished by supporting the sleeve 11 on the anvil 22, as depicted in Fig. 4, and then striking the shank a swaging blow, suitable clearance being provided about the head 18 to avoid obstruction thereby.

When the shank 12 is struck, the shaft will be forced downwardly into the sleeve and, being harder, will serve to slightly expand such sleeve. This is depicted in the enlarged showing of Fig. 5, wherein the impactive action above described has driven the shaft downwardly within the sleeve to the double dot and dash line 23 position. The full line 24 indicates the normal position assumed by the sleeve surface after the rebound, while the full line 25 represents the outer end of the sleeve in its initial surface contour.

It will be noted that the surface 13, Fig. 4, is shown in the position normally occupied and in which position it will have slight endwise movement and be free to pivot within the bearing member. A result of the axial displacement of the shaft during the adhesion breaking step is to slightly reshape the internal wall of the sleeve and form an annular bead or ridge 26 at the intersection of the surfaces 24 and 25, Fig. 5. This ridge is slightly larger in diameter than the minimum diameter of the curved surface 13 of the shaft thus providing a minimum clearance space. The degree of clearance will be determined by the extent of axial movement given the shaft during the impactive action thereupon. Preferably the extent of axial movement is only sufficient to break the adhesion between the parts, whereby minimum clearance will be had between the bearing surfaces. When the bearing sleeve is molded about the shaft member, it is preferable to coat the shaft member with graphite so as to reduce the molding adhesion between the parts and also to make it easier to break such adhesion.

To provide for the easy and rapid assembly of the unit with connecting power transmitting linkage the link members 27 are provided with openings to receive the sleeves 11 and within these openings may be arranged grommets 28, preferably of rubber, to line the sleeve receiving openings of the links. In order to confine the pivotal action of the link to the bearing surfaces of the unit, and to prevent the rotation of the grommet upon the sleeve member of the unit upon which it is mounted, there is provided an opening or recess 29 in each link for engagement with the retaining pin 15 of the sleeve member, whereby the sleeve member will move in unison with the link member. The construction also prevents wear between the grommet and the bearing sleeve.

A retaining plate 30 having a key slot 31 is engaged over the head 19 of the shaft member, a washer 32 being initially placed upon the adjacent cylindrical portion 17 whereby to limit lateral movement of the link. The retaining plates are extended toward each other and a spring 33 serves to keep them in position. The outer ends of one of the link members 27 may be connected to the windshield wiper arms, one being generally indicated at 34.

While the riveting of the shank 12 to the crank arm 8 is described as occurring during the adhesion breaking step in the method of forming the unit, it is obvious that the swaging operation could be performed separately.

The foregoing detailed description has been made for ease in comprehending the invention and not by way of limitation since the inventive principles involved are capable of being carried out in other than the manner specifically set forth herein without departing from the spirit of the invention and the scope of the appended claims.

What is claimed is:

1. A transmission assembly comprising a unit having a unitary sleeve member, a shaft member rotatably carried by said sleeve member, said members being formed with interengaging surfaces so shaped as to be held against axial separation, a link member connected to said sleeve member, said shaft member projecting beyond said sleeve member and formed with a grooved head, and retaining means carried by said head and engaging said link to prevent axial displacement thereof.

2. A transmission assembly comprising a unit having a unitary sleeve member, a shaft member rotatably carried by said sleeve member, said members being formed with interengaging surfaces so shaped as to be held against axial separation, a link member having an opening receiving said sleeve member, said sleeve member having a pin spaced from the sleeve axis and engaged with the link member to assure unison of motion therewith.

3. A transmission assembly comprising a unit having a unitary sleeve member, a shaft member rotatably carried by said sleeve member, said members being formed with interengaging surfaces so shaped as to be held against axial separation, said sleeve member having an upstanding arm, a bearing pin carried by said arm, and a link having an opening receiving the sleeve member and an adjacent recess for receiving said pin, whereby said link and said sleeve member will be prevented from rotating relatively to each other.

4. A transmission assembly comprising a unit having a unitary sleeve member, a shaft member rotatably carried by said sleeve member, said members being formed with interengaging surfaces so shaped as to be held against axial separation, said sleeve member having an upstanding arm, a laterally extending bearing pin carried by said arm, a link having an opening receiving the sleeve member and an adjacent recess receiving said pin, whereby said link and said sleeve member will be prevented from rotating relatively to each other, said shaft member having an end extending outwardly beyond said sleeve member and formed with a grooved head, and retaining means engaging said groove to retain said link in place.

5. A transmission assembly comprising a unit having a unitary sleeve member, a shaft member rotatably carried by said sleeve member, said members being formed with interengaging surfaces so shaped as to be held against axial separation, said sleeve member having a radially extending arm, a link having an opening receiving the sleeve member, and means connecting the radial arm to the link for movement in unison whereby to confine the rotatable action to the sleeve member upon the shaft member.

MARTIN BITZER.

REFERENCES CITED

The following references are of record in the file of this patent:

UNITED STATES PATENTS

| Number | Name | Date |
|---|---|---|
| 1,943,631 | Skillman | Jan. 16, 1934 |
| 2,000,838 | Gorton | May 7, 1935 |
| 2,079,113 | Erlewine | May 4, 1937 |
| 2,289,703 | Goerke et al. | July 14, 1942 |

Certificate of Correction

Patent No. 2,540,319

February 6, 1951

MARTIN BITZER

It is hereby certified that error appears in the printed specification of the above numbered patent requiring correction as follows:

Column 4, lines 23 and 24, for "an upstanding arm, a bearing" read *a bearing arm, an upstanding*; lines 35 and 36, for "an upstanding arm, a laterally extending bearing" read *a laterally extending bearing arm, an upstanding*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*